United States Patent [19]

Takaraga

[11] Patent Number: 4,975,768
[45] Date of Patent: Dec. 4, 1990

[54] IMAGE SIGNAL PROCESSING WITH SUPPRESSION OF BACKGROUND PORTION OF IMAGE

[75] Inventor: Yoichi Takaraga, Yokohama, Japan

[73] Assignee: Canon Kabushiki Kaisha, Tokyo, Japan

[21] Appl. No.: 274,979

[22] Filed: Nov. 22, 1988

[30] Foreign Application Priority Data

Dec. 9, 1987 [JP] Japan ................ 62-309380

[51] Int. Cl.⁵ .................................. H04N 1/46
[52] U.S. Cl. ................................ 358/75; 358/464
[58] Field of Search ............ 358/75, 80, 296, 464, 358/465, 466

[56] References Cited

U.S. PATENT DOCUMENTS 4,833,546  5/1989  Namakura et al. ............ 358/283

FOREIGN PATENT DOCUMENTS 165462  12/1981  Japan.
 45564   3/1982  Japan.
 54470   3/1982  Japan.
2086077   5/1982  United Kingdom.

Primary Examiner—Howard W. Britton
Attorney, Agent, or Firm—Fitzpatrick, Cella, Harper & Scinto

[57] ABSTRACT

An image signal processing apparatus and method, in which a background part of an original image is discriminated in accordance with an input image signal, and a printer is controlled not to print an area which corresponds to the background part.

27 Claims, 8 Drawing Sheets

| Sb \ Sa | 1 | 0 |
|---|---|---|
| 1 | Sc=1 | Sc=0 |
| 0 | Sc=0 | Sc=0 |

IMAGE SIGNAL PROCESSING WITH SUPPRESSION OF BACKGROUND PORTION OF IMAGE

BACKGROUND OF THE INVENTION

1. Field of the Invention

The present invention relates to an image signal processing apparatus and method, and specifically relates to an image signal processing apparatus and method which is able to prevent generation of a fog phenomenon (the phenomenon that the background of an original is recorded lightly or thinly, i.e., "dirty", or yellowed) in a digital reproducing apparatus, etc.

2. Related Art

In a conventional digital reproducing apparatus, to prevent generation of a fog phenomenon, there has been proposed a method in which one converts output density in accordance with image information obtained by scanning originals as shown in FIG. 13.

For example, when an input image signal which is obtained by detecting an image to be processed and which corresponds to the image density thereof is converted to an output image signal which corresponds to an output density level being suitable for subsequent processing, the input image signal under a predetermined level X is converted to a predetermined constant output level, and then insofar as the input image signal is over the level X, the higher the level of input image signal, the higher the level of output image signal, in an almost linear relationship. This method is proposed in Japanese Laid Open Patent No. 1981-165462.

As another example, the density of an original is detected, a histogram is formed in accordance with densities of many points in the original, and the input signal is converted to a predetermined output signal in accordance with a pattern of the histogram. This method is proposed in Japanese Laid Open Patent No. 1982-45564.

However, these conventional methods which use density conversions to prevent generation of the fog phenomenon, cannot reproduce a part of low density, e.g., skin of human face, clearly or with sufficient fidelity.

SUMMARY OF THE INVENTION

It is an object of the present invention to overcome the above mentioned shortcomings of the conventional apparatus and method.

In accordance with the present invention, an image signal processing apparatus and method are provided which enables preventing the generation of the fog phenomenon of the background part without making a sacrifice of halftone reproduction quality.

In one aspect of the present invention, an image signal processing apparatus is provided which has means for providing an input image signal, a discriminator for discriminating and extracting a background part of an original image in accordance with the input image signal, and a controller for controlling a printer not to print an area corresponding to the background part in accordance with the discrimination performed by the discriminator. As a result of this structure, this aspect of the present invention enables prevention of the generation of the fog phenomenon of the background part without making a sacrifice of halftone reproduction quality.

In another aspect of the present invention, an image signal processing method is provided which includes steps of providing an input image signal corresponding to an original image, discriminating a background part of the image in accordance with the input image signal, and controlling a printer not to print an area corresponding to the background part in accordance with the discrimination performed in the discriminating step. Thereby, the area corresponding to the background of the original image is not printed with recording materials, and generation of the fog phenomenon is prevented without sacrificing halftone reproduction quality.

The foregoing summary of certain more important features of the invention is provided in order that the detailed description of the preferred embodiments thereof that follows may be better understood, and in order that the present contribution to the art may be better appreciated. There are, of course, additional features of the invention that will be described in that detailed description with reference to the accompanying drawing.

Those skilled in the art will appreciate that the conception upon which this disclosure is based may readily be utilized as a basis for designing other structures or methods for carrying out the purposes of the invention. It will be understood that the claims are to be regarded as including such other constructions and methods as do not depart from the spirit and scope of the invention.

DETAILED DESCRIPTION OF THE PREFERRED EMBODIMENTS

Figure 1:
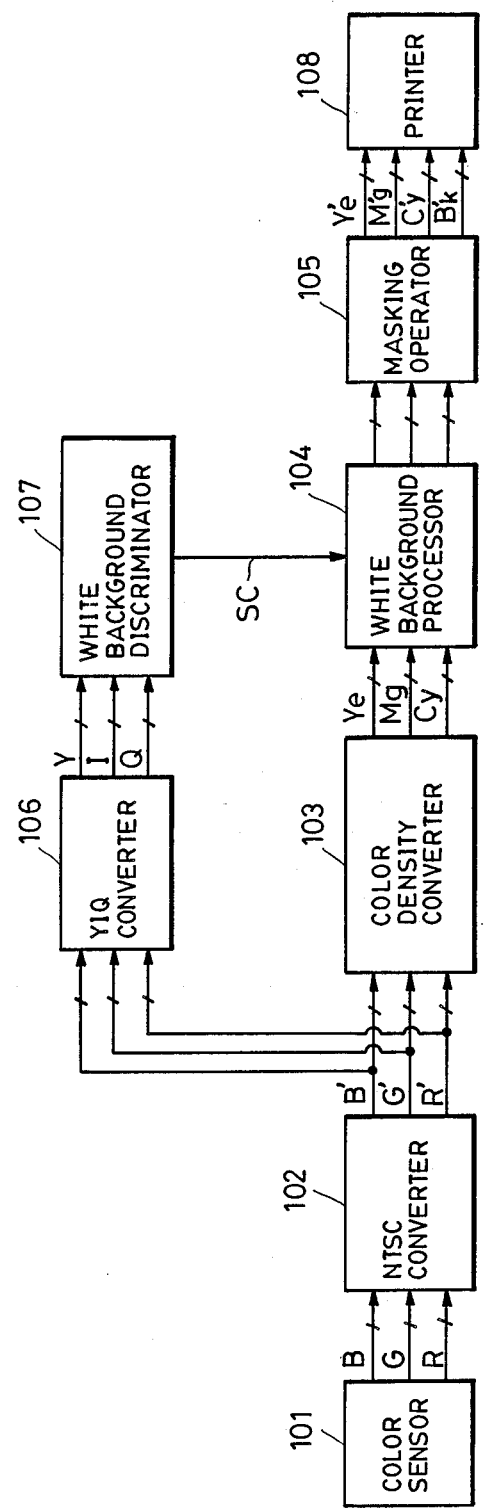
FIG. 1 is a block diagram of an embodiment of the present invention.

FIG. 1 shows a block diagram of a color image processing apparatus of a first embodiment of the present invention. In FIG. 1, the image processing apparatus includes a color sensor 101 which includes a solid state imaging device, e.g., a CCD, for reading color image information (optical image) and for providing three separated color signals R (red), G (green) and B (blue), and an analog-to-digital (A/D) converter for converting the analog signals R, G and B to digital signals. In this embodiment each of the digital signals R, G and B which is output from the sensor 101, has 8 bits.

An NTSC converter 112 is provided for converting the digital signals R, G and B from the sensor 101 to standard color signals R', G' and B' of the NTSC (National Television System Committee) type using the following matrix operation:

$$\begin{pmatrix} R' \\ G' \\ B' \end{pmatrix} = \begin{pmatrix} 0.994 & 0.106 & -0.1 \\ -0.122 & 1.387 & -0.265 \\ -0.1 & -0.155 & 1.255 \end{pmatrix} \begin{pmatrix} R \\ G \\ B \end{pmatrix}; \quad (1)$$

The coefficients or matrix elements used in formula (1) are decided in accordance with a characteristic of the color sensor 101, and can be obtained by experiment. In this embodiment, the standard color signals R', G' and B' of the NTSC type which is used in the U.S.A. and Japan are used as input color signals, whereby this image processing apparatus is able to deal with not only color signals from the color sensor 101 but color signals from the color TV camera, e.g., an imaging tube or a VCR. And, the standard color signals R', G' and B' are easy to converted to a luminance signal Y and chrominance signals I and Q.

A YIQ converter 106 is provided for converting standard NTSC color signals R', G' and B' from the NTSC converter 102 to the luminance signal Y and chrominance signals I and Q with the following matrix operation (2):

$$\begin{pmatrix} Y \\ I \\ Q \end{pmatrix} = \begin{pmatrix} 0.30 & 0.59 & 0.11 \\ 0.60 & -0.28 & -0.32 \\ 0.21 & -0.52 & 0.31 \end{pmatrix} \begin{pmatrix} R \\ G \\ B \end{pmatrix}. \quad (2)$$

A white background discriminator 107 is provided for discriminating an area of white background in accordance with the luminance signal Y and the chrominance signals I and Q obtained from the YIQ converter 106, and for outputting a white background discriminatory signal SC. The discriminator 107 outputs the signal SC=1, when the value of the luminance signal Y is larger than a constant α, and the distance from the origin (an achromatic color) of the axes I and Q of the color represented by values of the chrominance signals I and Q is shorter than a constant A which is close to the origin. The constant α is initially set close to a value representing white background.

A color density converter 103 is provided for converting the standard R', G' and B' signals, which are proportional to quantity of light, from the NTSC converter 102 to color density signals Ye (Yellow), Mg (Magenta) and Cy (Cyan) which are proportional to density of recording colors.

A white background processor 104 receives as inputs the color density signals Ye, Mg and Cy from the color density converter 103, and the discriminating signal SC from the discriminator 107, and replaces the values of the density signals Ye, Mg, Cy with 0 when the discriminating signal SC equals 1. A masking operator 105 which is connected to the white background processor 104 is provided for converting the density signals Ye, Mg and Cy processed by the processor 104 to recording density signals Ye' (Yellow), Mg' (Magenta), Cy' (Cyan) and Bk' (Black) which are matched to characteristics of recording materials, e.g., toner or ink of a printer 108 with the following matrix operation (3):

$$\begin{pmatrix} Ye' \\ Mg' \\ Cy' \\ Bk' \end{pmatrix} = \begin{pmatrix} a11 & a12 & a13 & a14 \\ a21 & a22 & a23 & a24 \\ a31 & a32 & a33 & a34 \\ a41 & a42 & a43 & a44 \end{pmatrix} \begin{pmatrix} Ye \\ Mg \\ Cy \\ Min(Ye,Mg,Cy) \end{pmatrix}.$$

In formula (3), min (Ye, Mg, Cy) represents the minimum value from among the density signals Ye, Mg and Cy, which value corresponds to a maximum value of the signals B', G' and R'.

Figure 2:
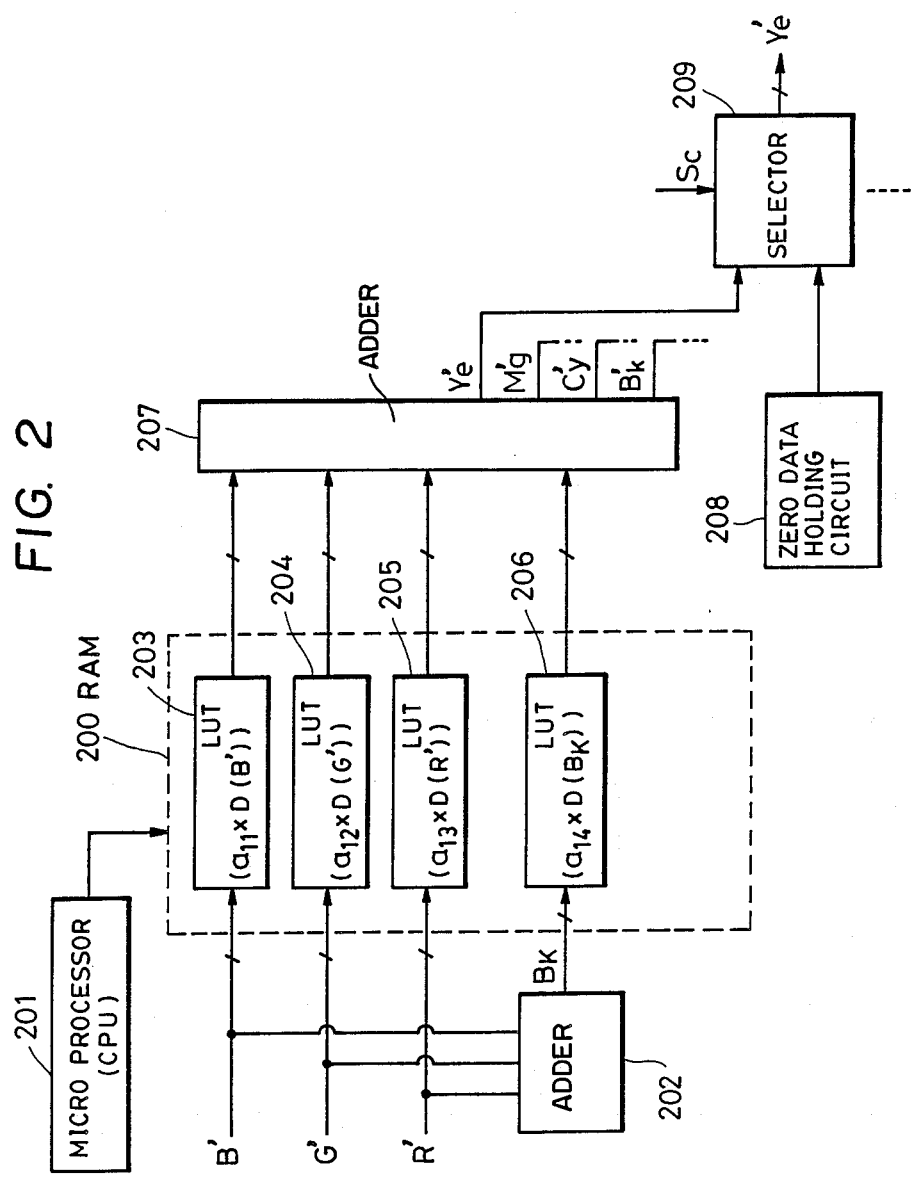
FIG. 2 is a block diagram showing structure of the density converter, masking operator and a white background processor of the embodiment of FIG. 1.

The masking operator 105, as shown in FIG. 2, might be replaced in the position of the color density converter 103, and the masking operator might carry out both the color density conversion and the masking operation with one look-up table.

The printer 108 is provided for printing images of the recording color signals Mg', Cy', Ye' and Bk' on a recording medium. For example, a color laser printer, a color inkjet printer or a color thermal transfer printer can be used.

FIG. 2 shows another example of concrete circuits having the same function as the color density converter 103, the white background processor 104 and the masking operator 105 in FIG. 1. A signal converter 200 has look-up tables 203, 204, 205 and 206 which may for example be RAMs (Random Access Memories).

The symbols D(B'), D(G'), D(R') and D(Bk) in the blocks 203 through 206 represent conversions from the color signals B', G', R', Bk, respectively, which are proportional to amounts of light to the color density signals Ye, Mg, Cy and Bk. The coefficients a11 through a14, a21 through a24, a31 through a34, and a41 through a44 are set by a microprocessor 201 (CPU) such that the color density conversion and multiplying operations effected by the matrix operation of formula (3) are simultaneously carried out. A maximum value gate circuit 202 selects the maximum value among the color signals B', G', R' and outputs the black signal Bk. An adder 207 is provided for adding values output from the looking up tables 203 through 206. In other words, the adder 207 performs the adding operation of formula (3). A zero data holding circuit 208 is provided for holding data 0 (zero) to replace data of the density signals with 0 when the discriminator 107 discriminates a white background pixel.

A selector 209 is provided for changing the density signal Ye' to data 0 in response to the signal SC=1. FIG. 2 only illustrates selection of Ye'; however, other density signals Mg', Cy' and Bk' are changed in response to the signal SC in the same way by the same selectors and holding circuits.

Figures 3, 4:
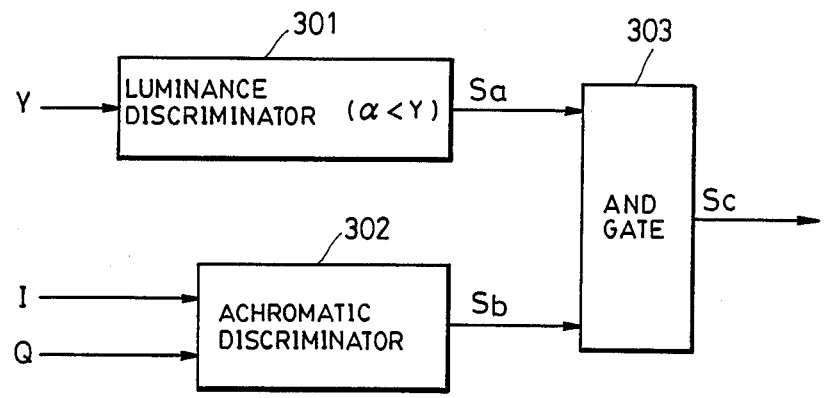
FIG. 3 is a block diagram shows a structure of the white background discriminator of the embodiment of FIG. 1.
FIG. 4 is a truth table illustrating operation of the white background discriminator shown in FIG. 3.

FIG. 3 shows a concrete example of a circuit which can serve as the discriminator 107 in FIG. 1. In FIG. 3, a luminance discriminator 301 is provided for discriminating whether the value of the luminance signal Y is greater than the predetermined value X or not, and for outputting a signal Sa=1 when the value of Y is greater than X. This discrimination is performed for every pixel.

That is, if $\alpha < Y$, $Sa=1$, and if $\alpha \geq Y$, $Sa=0$.

An achromatic discriminator 302 is provided for discriminating whether a saturation representing the chrominance signals I and Q is within a region of almost achromatic color, as follows, and for outputting a signal $Sb=1$ when the saturation is within the region.

That is, if $Sb=1$ (achromatic color), and $Sb=0$ (not achromatic color).

Both signals Sa and Sb are input to an AND gate (logic AND) 303, and the gate 303 outputs the signal $SC=1$ when both signals Sa and Sb are 1, as shown in FIG. 4. This discrimination is performed for every pixel. The signal SC is output to all selectors shown in FIG. 2 for the signals Ye', Mg', Cy' and Bk'.

Figure 5:
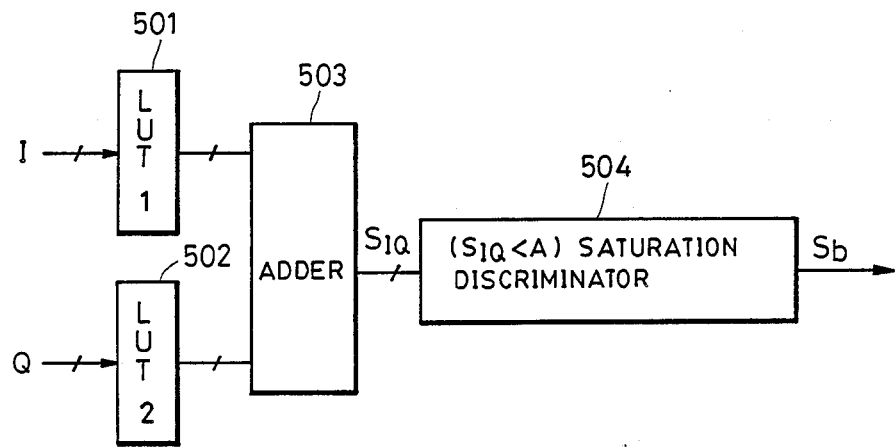
FIG. 5 is a block diagram showing a concrete structure of the achromatic color discriminator shown in FIG. 3.
Figure 6:
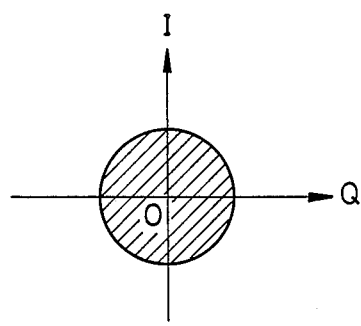
FIG. 6 is a chart of coordinates for a space having I and Q axes, which shows a discriminating area for discriminating an achromatic area in the achromatic color discriminator shown in FIG. 3.

FIG. 5 shows a concrete example of a circuit which can serve as the achromatic discriminator 302 in FIG. 3. FIG. 6 shows a region of almost achromatic color in IQ space, which has an axis I and an axis Q. In FIG. 6, the cross-hatched area can be taken as the region of almost achromatic color; it will be noted that the region is close to the origin in IQ space.

Defining the quantity $S_{IQ}=K_1I^2+K_2Q^2$ (where $K_1$ and $K_2$ are constants), it will be seen that $S_{IQ}$ increases with the saturation. Then, taking as a limit of the region of almost achromatic color a value A, whether I and Q represent achromatic or not achromatic image can be discriminated by comparing the value of $S_{IQ}=K_1I^2+K_2Q^2$ with the value A.

That is, if $S_{IQ}<A$, $Sb=1$, and if $S_{IQ}\geq A$, $Sb=0$.

In FIG. 5, look-up tables 501 and 502 structured by ROMs (Read Only Memories) are provided for outputting the values $K_1I^2$ and $K_2Q^2$ in response to the respective inputs I and Q. An adder 503 is provided for adding $K_1I^2$ and $K_2Q^2$ from the tables 501 and 502, and for outputting the signal $S_{IQ}$, which represents the result of the addition. A saturation discriminator 504 is provided for comparing the value of the signal $S_{IQ}$ with the predetermined constant A, and for outputting the signal $Sb=1$ when the constant A is bigger than the value $S_{IQ}$.

As described above, an original image is read by the color sensor 101, and the color signals B, G and R which are proportional to the amounts of light are output. The color signals B, G and R are converted to the recording density signals Ye', Cy', Mg' and Bk' corresponding to recording materials by the NTSC converter 102, the color density converter 103, the white background processor 104 and the masking operator 105. These signals Ye', Cy', Mg and Bk' are output to the printer 108, and the printer 108 prints the color image on the recording medium. When the white background discriminator 107 discriminates white background, the white background processor 104 replaces all of the color density signals with 0 data, which is output to the printer 108. Thereby, the printer 108 does not print in the white background area of the original image, and thus the fog phenomenon (the white background area being reproduced with yellowing or dirty) does not occur. As a result, high quality and high gradation images can be reproduced.

Further, in this embodiment, since the series of processing steps for discriminating the white background region is separate from the series of processing steps for generating the recording color signals, it can be ensured that an operational error in the processing for discriminating the white background region does not cause signal deterioration of recording color signals.

Other examples are explained as follows.

In the first embodiment, the constant $\alpha$ which is used for discriminating the luminance signal Y in the discriminator of FIG. 3 is set as a solid value. However, background of originals might be somewhat colored, e.g., cream colored, because of paper quality, passage of time, etc.

Figure 7:
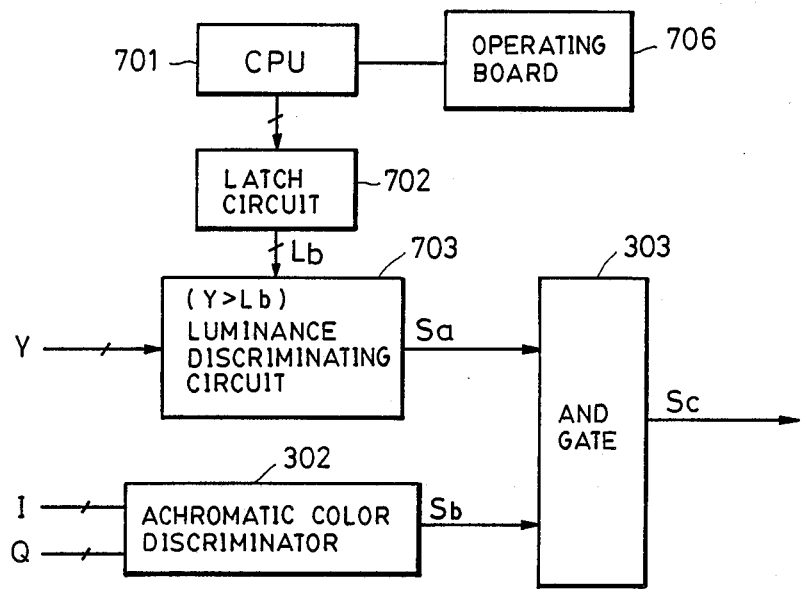
FIG. 7 is a block diagram showing another structure of white background discriminator for use in the embodiment of FIG. 1.

FIG. 7 shows another embodiment in which the constant $\alpha$ can be set freely by an operator so as to correspond to background density of various kinds of originals.

In FIG. 7, an operating board 706 is provided for designation of the value of the background density by the operator. The designated value of the background density set by means of the operating board 706 is held in a latch circuit 702 as a standard value Lb via a CPU (microprocessor) 701, which also controls the operating board 706.

The standard value Lb held in the latch circuit 702 is input to a luminance discriminating circuit 703 which has the same function as the discriminator 301 in FIG. 3. The discriminating circuit 703 compares the value of the signal Y with the standard value Lb, and outputs the signal $Sa=1$ to the AND gate 303 when the value of the signal Y is bigger than the value Lb. The AND gate 303, as described above, outputs the signal $SC=1$ to the selector 209 (FIG. 2) of the processor 104 (FIG. 1) when the signal Sa and the output signal Sb from the achromatic discriminator 302 are both 1.

Figure 8:
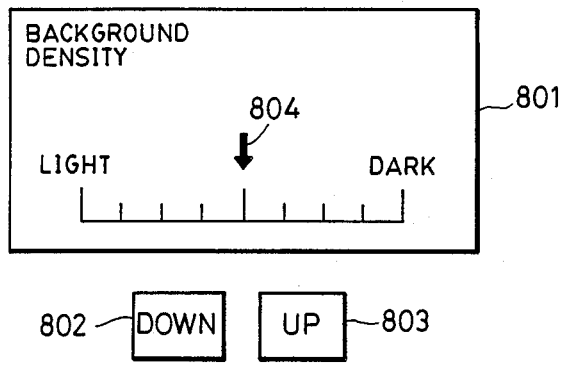
FIG. 8 is a top plan view of the operating board shown in FIG. 7.

FIG. 8 shows an example of structure of the operating board 706 in FIG. 7. In FIG. 8, the operating board 706 has a liquid crystal display 801 for displaying the designated background density value, a down key 802 for reducing down the designated value, and an up-key 803 for raising the designated value. The liquid crystal display 801 has an arrow display 804 which shows the designated value.

When the up-key 803 is depressed by the operator, the arrow display 804 moves stepwise to the right in the display 801, to a darker setting, and when the down key 802 is depressed by the operator, the arrow display 804 moves stepwise to the left in the display 801, to a lighter setting.

In FIG. 8, the designated value is displayed by the analog display, but of course a digital display might be used. A ten-key or a slide lever might be used instead of the up-key 83 and the down key 802.

Figure 9:
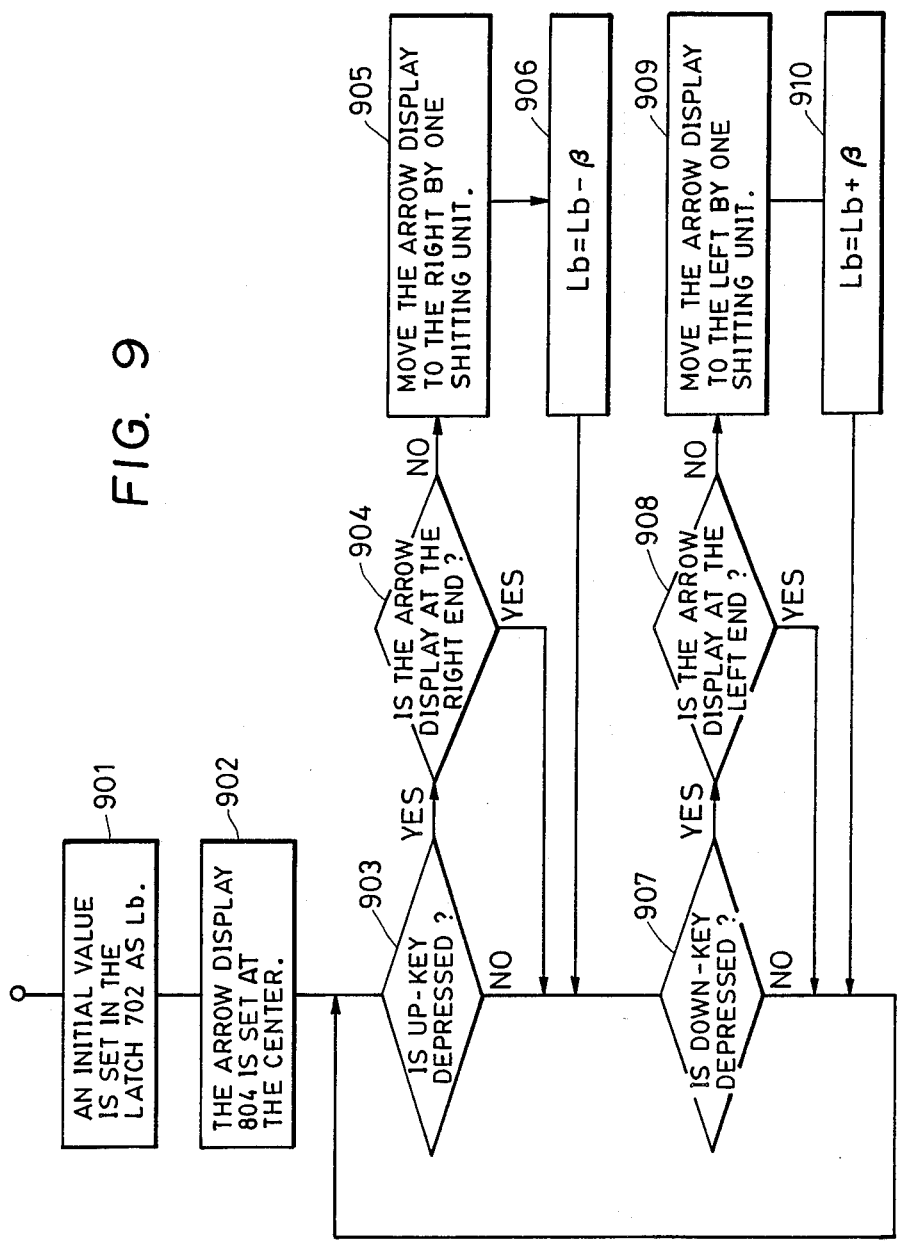
FIG. 9 is a flowchart showing an operational procedure of the microprocessor shown in FIG. 7.

FIG. 9 is a flowchart showing an example of a control procedure of the CPU 701.

After power is supplied from a electrical power source, initial data is set in the latch circuit 702 in a step 901. The arrow display 804 is set at the center of the liquid crystal display 801 in a step 902. In a step 903 whether the up-key 803 is depressed or not is checked. When the up-key 803 is depressed, whether the arrow display 804 is positioned at the right end is checked in a step 904. When the arrow display 804 is not positioned at the right end, the arrow display 804 is moved to the right by one shifting unit on the display 803 in a step 905, and a constant β corresponding to one shifting unit is substracted from the standard value Lb in the latch circuit 702, then a new value Lb (equal to the previous value of Lb minus β) is renewed as a new standard value in the latch circuit 702 in a step 906.

In a next step 907, it is checked whether the down key 802 is depressed. When the down key 802 is depressed it is checked if the arrow display 804 is positioned at the left end of the display 803 in a step 908. Unless the arrow display 804 is at the left end of the liquid crystal display 803, the arrow display 804 is shifted to the left by the predetermined unit in a step 909, and the value β is added to the standard value in the latch circuit 902, then the value Lb (equal to the previous value of Lb plus β), is renewed as a new standard value and stored in the lath circuit 902 in a step 910. Then the procedure returns to the step 903 for checking whether the keys 802, 803 are still depressed.

When the up-key 803 is not depressed in the step 903, or when the arrow display 804 is at the right end in the step 904 even if the up-key is depressed, the procedure of the CPU 701 advances to the step 907. Similarly, when the down-key 802 is not depressed in the step 907, or when the arrow display 804 is at the left and in the step 908 even if the down-key is depressed, the procedure of the CPU 701 returns to the step 903 to repeat the above-mentioned procedure in accordance with key input.

In this second embodiment, since other features are same as the first embodiment shown in FIG. 1 through FIG. 6 explanation of those other features is omitted.

Figure 10:
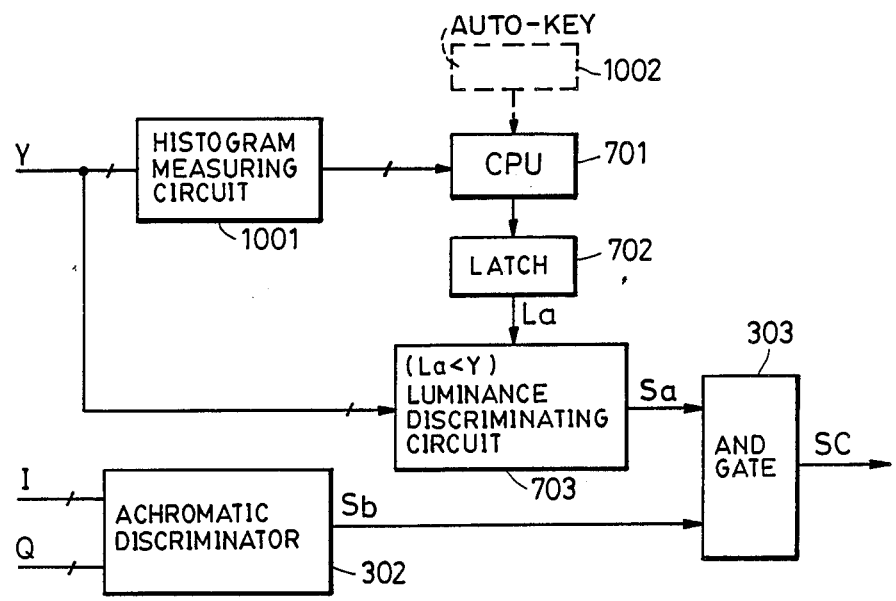
FIG. 10 is a block diagram showing another structure of white background discriminator.

FIG. 10 shows another embodiment, which can automatically set a standard value for discriminating white background corresponding to the background density of the original, in response to the luminance signal Y obtained from the original image signal. In FIG. 10, a histogram measuring circuit 1001 is provided for measuring a histogram of the luminance signal Y, representing a distribution of the luminance information of the original during pre-scanning of the color sensor 101 before reading of the original for reproduction, and for outputting the histogram data to the CPU 701. The CPU 701 sets a standard value La for discriminating white background at the latch circuit 702 in accordance with the histogram data of the signal Y from the measuring circuit 1001, as described below in connection with FIG. 11 and FIG. 12. The standard value La is supplied to the discriminator 703. The discriminator 703 compares input luminance signal Y which is obtained during actual scanning (after the prescanning) with the standard value La, and outputs the output signal Sa=1 to the AND gate 303. The AND gate 303 outputs the discriminating signal SC=1 to the white background processor 104 (FIG. 1) when the signal Sa and the signal Sb from the achromatic color discriminator 302 are both 1. In this third embodiment, other features are same as the first embodiment in FIG. 1 through FIG. 6, and therefore explanation of those other features is omitted.

An auto-key 1002 which is operatively connected to the CPU 701 might be provided for manually selecting between automatic setting of the standard value Sa in the third embodiment and manual setting. In such case, when the auto-key 1002 is turned on, the process of the third embodiment in FIG. 10 through FIG. 12 is carried out, and when the auto-key 1002 is turned off, the process of the second embodiment in FIG. 7 through FIG. 9 is carried out or the first embodiment, which uses the constant value α in FIG. 1 through FIG. 6, is carried out.

Further, a display device might be provided for displaying the standard value La determined by the CPU 701, which could be like the liquid crystal display 801 in FIG. 8 or another display (not shown) for displaying digital numerals.

Figure 11:
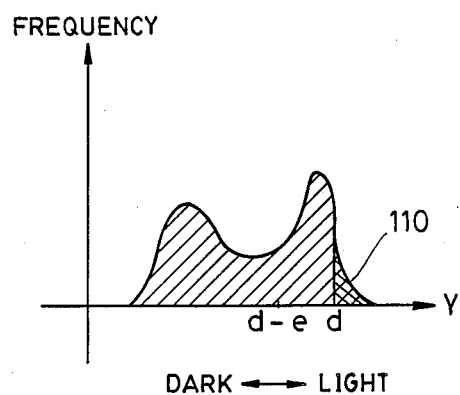
FIG. 11 is a chart showing an example of a histogram of a luminance signal transferred from a histogram measuring circuit to the microprocessor shown in FIG. 10.
Figure 12:
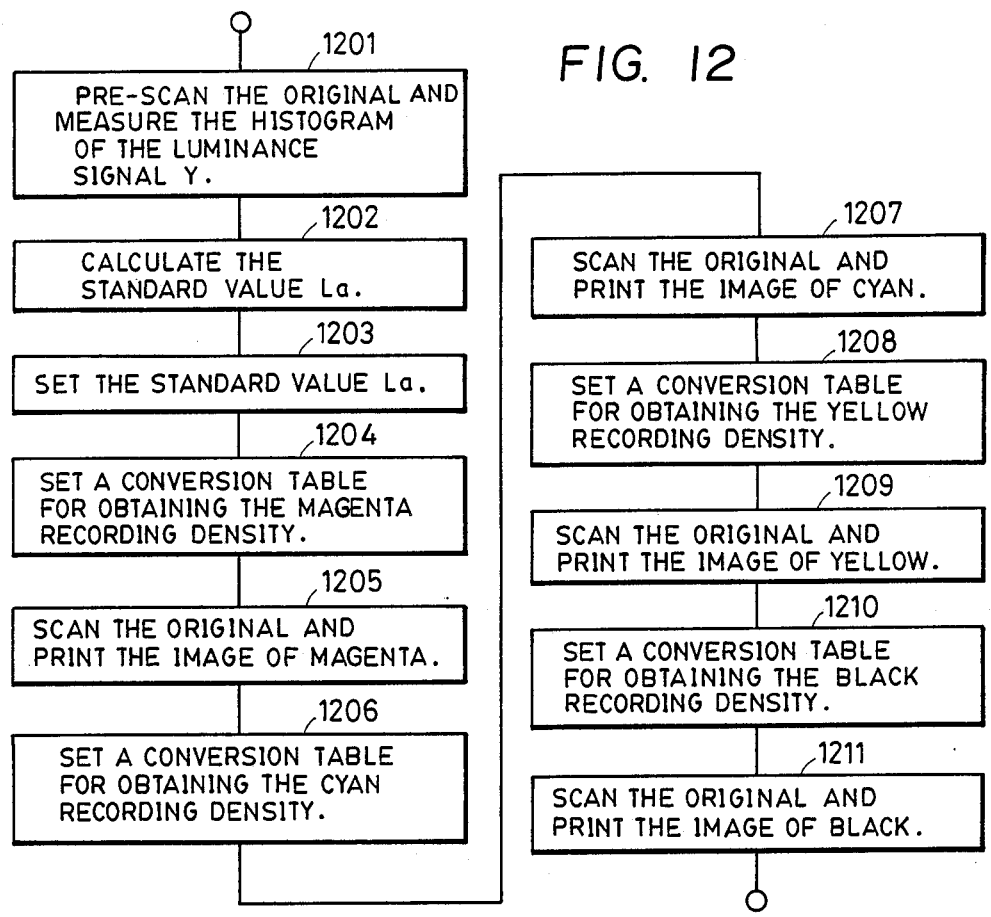
FIG. 12 is a flowchart showing the control procedure of the microprocessor shown in FIG. 10.
Figure 13:
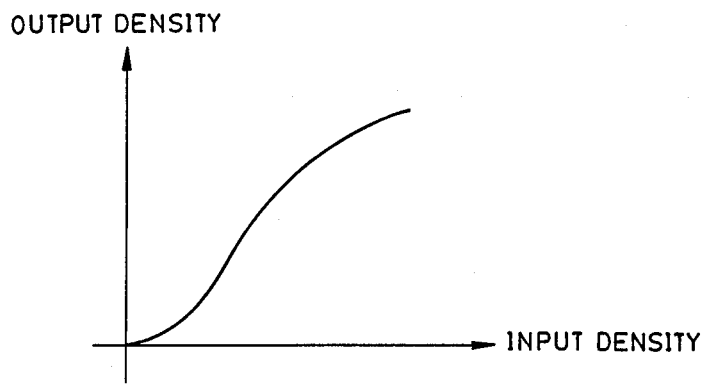
FIG. 13 is a characteristic of an example of a conventional density conversion.

FIG. 11 shows an example of the histogram of the signal Y obtained by the measuring circuit 1001. In FIG. 11, the horizontal axis shows values of the luminance signal Y and the vertical axis shows values of frequency of the signal Y. The CPU 701 operates to obtain a value d of the luminance signal Y, when the summation of frequencies from high-light portion of the signal Y (which is shown as part 10, cross hatched) is over a predetermined value r, the maximum value of the signal Y is set as the value d.

The standard value La is determined in accordance with the value d and the following equation (4), and the resulting value is held in the latch circuit 702:

$$La = d - e \qquad (4)$$

where e is a predetermined value. The constant value r is provided for removing a part of noise signal, and the value e is a correction value for setting La closer to the background density.

FIG. 12 shows an example of control operation procedure of the CPU 701 in FIG. 10.

The CPU 701 causes prescanning of an original image in response to actuation of a start key (not-shown) on the operating board, and causes the histogram measuring circuit 1001 to obtain the histogram of the luminance signal Y in a step 1201. Then the standard value La is calculated, corresponding to a background value of the luminance signal Y of the original, as explained above, using the operation described in connection with FIG. 11, in accordance with the measured data from the measuring circuit 1001, in a step 1202. In a step 1203 the standard value La is set in the latch circuit 702. The CPU 701, in a step 1204, sets a conversion table for the following multiplying and adding operation (5), which is used for obtaining the magenta recording density Mg', in look-up tables 203 through 206 in FIG. 2:

$$Mg' = a_{21}Ye + a_{22}Mg + a_{23}Cy + a_{24}Bk \qquad (5)$$

The CPU 701, in a step 1205, drives a scanner to scan the original and causes the printer 108 to print the image of magenta Mg' on a recording medium, e.g., a cut paper. Similarly, images of other colors are printed sequentially. Thus, in a step 1206, the CPU 701 sets a conversion table of the following operation (6) for obtaining the cyan recording density Cy', in look-up tables 203 through 206:

$$Cy' = a_{31}Ye + a_{32}Mg + a_{33}Cy + a_{34}Bk \qquad (6)$$

Then, in a step 1207, the CPU 701 causes the scanner to scan the original and the printer 108 to print the image of yellow Ye' on the same recording medium. Similarly, in a step 1209, the CPU 701 sets a conversion table of the following operation (7) for the yellow recording density Ye' in tables 203 through 206:

$$Ye' = a_{11}Ye + a_{12}Mg + a_{13}Cy + a_{14}Bk \qquad (7)$$

Then, in a step 1209, the CPU 701 causes the scanner to scan the original and the printers 108 to print the image of yellow Ye' on the same recording medium. Similarly, in a step 1210, the CPU 701 set a conversion table of a following operation (8) for the black recording density Bk' in tables 203 through 206:

$$Bk' = a_{41}Ye - a_{42}Mg + a_{43}Cy + a_{44}Bk \quad (8)$$

Then, in a step 1211, the CPU 701 causes the scanner to scan the original once more and the printer 107 to print the image of black Bk' on the same recording medium, and the recording medium, on which the color images are overlaid, is discharged. Data for the prescribed conversion tables might instead be stored in advance in the ROM in the CPU 701, or might be calculated one after another in accordance with characteristics of the recording materials.

As described above, a full color image is reproduced on the recording medium, and the full color image has the same color characteristic as the original. Especially, the background area on the recording medium which corresponds to the background of the original is printed with nothing by the white processing. Therefore, a high quality and clear color image without dirty background can be obtained.

In this embodiment, the scanning of the original (excepting the prescanning) is carried out a number of times equal to the number of printing colors. However, all color information of an original might be stored in suitable storing means, e.g., a frame memory, temporarily, and the above mentioned recording operation might be performed sequentially in accordance with the stored color information of the original. And, in the described embodiment, the color images are sequentially printed in an order Mg', Cy', Ye' and Bk'. However, the color images are almost simultaneously printed using a color inkjet printer or a color laser beam printer having a plurality of light beams, with parallel processing.

Further, in this embodiment, the color processing is explained, but the present invention can apply as well as monochromatic processing.

In the described embodiments, the white background area is discriminated by using the luminance signal Y and the chrominance signals I and Q. However, the white background area might be discriminated by other signals, e.g., three original primary color signals R, G and B, equal color space signals L*, a* and b* of the CIE coloring system, etc.

In these embodiments, only the standard value of the luminance discrimination is variable or automatically set. However, in the achromatic discrimination, an area of almost achromatic color might be variable or automatically set, especially for a background area which is cream colored or sepia colored. If a background area can be designated by a pointing device and optical data of the background area can be obtained, the standard value of the luminance discrimination and the area of the achromatic color can be easily set.

Further, in these embodiments, the color signals are input from the scanner. However, the color signals might be obtained from a video cassette recorder, a still video recorder, a semiconductor or optical memory, etc.

As explained above, the image signal processing apparatus of the present invention discriminates the background area of an original in accordance with an input image signal, and prohibits recording of a pixel which is discriminated to be a pixel of the background area of a reproduced density signal from the input image signal. Therefore, without lacking desired halftone characteristics, it is ensured that the fog phenomenon will not occur in the background area on the recording medium which corresponds to the background area of the original.

Although particular embodiments of the present inventor are herein disclosed for the purpose of explanation, various modifications thereof, after study of this specification, will be apparent to those skilled in the art to which the invention pertains.

What is claimed is:

1. An image signal processing apparatus for use with a printer for recording an image, comprising:
   means for providing an input image signal corresponding to an original image;
   a discriminator for discriminating a background part of the original image in accordance with the input image signal; and
   a controller for controlling the printer to suppress printing an area which corresponds to the background part, in accordance with a discrimination performed by said discriminator, wherein the input image signal comprises a plurality of color component signals.

2. An image signal processing apparatus according to claim 1, further comprising a converter for converting the input image signal to a recording density signal for reproduction by the printer, wherein said discriminator and said converter use independent respective input signals.

3. An image signal processing apparatus according to claim 1, wherein said discriminator has means enabling a standard value for use in discriminating operation of said discriminator to be set at will by an operator.

4. An image signal processing apparatus according to claim 1, wherein said discriminator extracts the background part in accordance with both a luminance signal and a chrominance signal from the plurality of color component signals.

5. An image signal processing apparatus according to claim 4, wherein said discriminator has means enabling a standard value for discriminating for the luminance signal by said discriminator to be set at will by an operator.

6. An image signal processing apparatus according to claim 4, wherein said discriminator sets a standard value for the luminance signal for discriminating the background part in accordance with a histogram of the luminance signal.

7. An image signal processing apparatus according to claim 4, wherein said discriminator extracts an almost achromatic color area in accordance with the chrominance signal.

8. An image signal processing method, comprising the steps of:
   providing an input image signal corresponding to an original image;
   discriminating a background part of the original image in accordance with the input image signal; and
   controlling a printer not to print an area which corresponds to the background part discriminated in said discriminating step, wherein the input image signal comprises a plurality of color component signals.

9. An image signal processing method according to claim 8, further comprising the step of obtaining a recording density signal from the input image signal, for use in the printer.

10. An image signal processing method according to claim 8, further comprising the step of setting a standard value for use in said discriminating step.

11. An image signal processing method according to claim 8, wherein said discriminating step includes discriminating the background part in accordance with both a luminance signal and a chrominance signal from the plurality of color component signals.

12. An image signal processing method according to claim 11, further comprising the step of setting a standard value for use in discriminating the luminance signal in said discriminating step.

13. An image signal processing method according to claim 11, wherein an almost achromatic area is distinguished in accordance with the chrominance signal in said discriminating step.

14. An image signal processing method according to claim 11, wherein a standard value for the luminance signal is used for discriminating the background part in accordance with a histogram of the luminance signal.

15. An image signal processing apparatus for use with a printer for recording an image, comprising:
   means for providing an input image signal corresponding to an original image;
   a discriminator for discriminating a background part of the original image in accordance with the input image signal;
   a controller for controlling the printer to suppress printing an area which corresponds to the background part, in accordance with a discrimination performed by said discriminator; and
   a converter for converting the input image signal to a recording density signal for reproduction by the printer, wherein said discriminator and said converter use independent respective input signals.

16. An image signal processing apparatus according to claim 15, wherein said discriminator has means enabling a standard value for use in discriminating operation of said discriminator to be set at will by an operator.

17. An image signal processing apparatus according to claim 15, wherein the input image signal comprises a plurality of color component signals.

18. An image signal processing apparatus according to claim 17, wherein said discriminator extracts the background in accordance with both a luminance signal and a chrominance signal from the plurality of color component signals.

19. An image signal processing apparatus according to claim 18, wherein said discriminator has means enabling a standard value for discriminating for the luminance signal by said discriminator to be set at will by an operator.

20. An image signal processing apparatus according to claim 18, wherein said discriminator sets a standard value for the luminance signal for discriminating the background part in accordance with a histogram of the luminance signal.

21. An image signal processing apparatus according to claim 18, wherein said discriminator extracts an almost achromatic color area in accordance with the chrominance signal.

22. An image signal processing method, comprising the steps of:
   providing an input image signal corresponding to an original image, the input image signal comprising a plurality of color component signals;
   discriminating a background part of the original image in accordance with the input image signal;
   controlling a printer not to print an area which corresponds to the background part discriminated in said discriminating step; and
   setting a standard value for use in said discriminating step.

23. An image signal processing method according to claim 22, further comprising the step of obtaining a recording density signal from the input image signal, for use in the printer.

24. An image signal processing method according to claim 22, wherein an almost achromatic area is distinguished in accordance with the chrominance signal in said discriminating step.

25. An image signal processing method according to claim 22, wherein the standard value is a standard value for the luminance signal, and is used in discriminating the background part in accordance with a histogram of the luminance signal.

26. An image signal processing method according to claim 22, wherein the input image signal comprises a plurality of color component signals, and wherein said discriminating step includes discriminating the background part in accordance with both a luminance signal and a chrominance signal from the plurality of color component signals.

27. An image signal processing method according to claim 26, wherein the standard value set in said setting step is used in discriminating the luminance signal in said discriminating step.

* * * * *

UNITED STATES PATENT AND TRADEMARK OFFICE
CERTIFICATE OF CORRECTION

PATENT NO. : 4,975,768

DATED : December 4, 1990

INVENTOR(S) : YOICHI TAKARAGi

Page 1 of 3

It is certified that error appears in the above-identified patent and that said Letters Patent is hereby corrected as shown below:

On the title page:

AT [19]

"Takaraga" should read --Takaragi--.

AT [75] INVENTOR

"Yoichi Takaraga" should read --Yoichi Takaragi--.

AT [56] REFERENCES CITED

U.S. Patent Documents,
"Namakura et al." should read --Numakura et al.--.

SHEET 6 OF 8

FIG. 9, "SHITTING" should read --SHIFTING-- (both occurrences).

COLUMN 1

Line 49, "above mentioned" should read --above-mentioned--.

COLUMN 2

Line 36, "shows" should read --showing--.

COLUMN 3

Line 31, "converted" should read --convert--.

UNITED STATES PATENT AND TRADEMARK OFFICE
CERTIFICATE OF CORRECTION

PATENT NO. : 4,975,768
DATED : December 4, 1990
INVENTOR(S) : YOICHI TAKARAGi

Page 2 of 3

It is certified that error appears in the above-identified patent and that said Letters Patent is hereby corrected as shown below:

COLUMN 4

Line 46, "out. A" should read --out. ¶ A--.
Line 50, "looking up" should read --look-up--.

COLUMN 5

Line 15, "and Sb=0" should read --and if Sb=0--.

COLUMN 6

Line 42, "down key 802" should read --down-key 802--.
Line 49, "down key" should read --down-key--.
Line 57, "up-key 83" should read --up-key 803-- and "down key 802." should read --down-key 802.--.
Line 60, "a" should read --an--.

COLUMN 7

Line 3, "substracted" should read --subtracted--.
Line 7, "down key" should read --down-key--.
Line 8, "down key 802" should read --down-key 802--.
Line 17, "lath circuit 902" should read --latch circuit 902--.
Line 25, "left and" should read --left end--.
Line 32, "FIG. 6" should read --FIG. 6,--.

COLUMN 8

Line 14, "signal Y, when" should read --signal Y. When--.
Line 16, "part 10," should read --part 110,--.

UNITED STATES PATENT AND TRADEMARK OFFICE
CERTIFICATE OF CORRECTION

PATENT NO. : 4,975,768
DATED : December 4, 1990
INVENTOR(S) : YOICHI TAKARAGi

It is certified that error appears in the above-identified patent and that said Letters Patent is hereby corrected as shown below:

COLUMN 9

Line 2, "printers 108" should read --printer 108--.
Line 4, "set" should read --sets--.
Line 10, "printer 107" should read --printer 108--.
Line 31, "above mentioned" should read --above-mentioned--.

COLUMN 10

Line 9, "ventor" should read --vention--.

Signed and Sealed this

Fourteenth Day of January, 1992

Attest:

HARRY F. MANBECK, JR.

*Attesting Officer*  *Commissioner of Patents and Trademarks*